(12) United States Patent
Albrecht et al.

(10) Patent No.: US 8,647,203 B2
(45) Date of Patent: Feb. 11, 2014

(54) TRANSACTION PRODUCT WITH SELECTIVELY ILLUMINATED BUTTONS

(75) Inventors: Jessica A. Albrecht, Woodbury, MN (US); Madelaine Ann Hague, St. Paul, MN (US); Aaron Muther, Crystal, MN (US); Allan Peters, Minneapolis, MN (US); Robert Jerome Weaver, Hugo, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 196 days.

(21) Appl. No.: 13/290,043

(22) Filed: Nov. 4, 2011

(65) Prior Publication Data

US 2013/0116050 A1    May 9, 2013

(51) Int. Cl.
*A63F 9/24* (2006.01)
*A63F 13/00* (2006.01)

(52) U.S. Cl.
USPC .................. 463/37; 463/25; 463/29; 463/46; 200/16 R; 200/61.1; 200/341; 200/342; 200/345

(58) Field of Classification Search
USPC ........ 463/46, 25.37; 446/468, 485; 200/16 R, 200/61.1, 341, 342, 345
See application file for complete search history.

(56) References Cited

U.S. PATENT DOCUMENTS

| | | | | |
|---|---|---|---|---|
| 1,389,088 A | * | 8/1921 | Alschuler | 200/60 |
| 3,699,294 A | * | 10/1972 | Sudduth | 200/243 |
| 3,760,137 A | * | 9/1973 | Shimojo et al. | 200/263 |
| 3,829,646 A | * | 8/1974 | Lorteije et al. | 200/513 |
| 3,932,722 A | * | 1/1976 | Obata et al. | 200/513 |
| 4,017,700 A | * | 4/1977 | West | 200/314 |
| 4,039,068 A | * | 8/1977 | Giorza et al. | 400/491 |
| 4,207,087 A | | 6/1980 | Morrison et al. | |
| 4,285,517 A | | 8/1981 | Morrison | |
| 4,289,943 A | * | 9/1981 | Sado | 200/513 |
| 4,359,220 A | | 11/1982 | Morrison et al. | |
| 4,378,478 A | * | 3/1983 | Deeg | 200/515 |
| 4,401,304 A | * | 8/1983 | Hamano | 463/3 |
| 4,441,001 A | * | 4/1984 | Miyano et al. | 200/308 |
| 4,463,232 A | * | 7/1984 | Takakuwa | 200/513 |
| 4,490,587 A | * | 12/1984 | Miller et al. | 200/5 A |
| 4,513,973 A | | 4/1985 | Sinclair | |

(Continued)

OTHER PUBLICATIONS

Office Action from Canadian Patent Application No. 2772668, mailed Sep. 20, 2012 (3 pages).

(Continued)

*Primary Examiner* — Steven J Hylinski
(74) *Attorney, Agent, or Firm* — Griffiths & Seaton PLLC; JoAnn M. Seaton

(57) ABSTRACT

A transaction product includes an electrical assembly, a housing, a button, and an account identifier. The electrical assembly includes a light. The housing substantially encloses the electrical assembly including the light, wherein the housing defines an exterior surface and an aperture extending through the exterior surface. The button has a rounded extremity and extends from within the housing to outside the housing through the aperture and beyond the exterior surface. The button aligns with and surrounds the light such that when the light is lit the button is illuminated. The account identifier is coupled to the housing and links the transaction product to a financial account having an associated monetary value available toward a price of a purchase, wherein the account identifier is machine readable.

17 Claims, 14 Drawing Sheets

(56) References Cited

U.S. PATENT DOCUMENTS

| | | | | |
|---|---|---|---|---|
| 4,536,625 A * | 8/1985 | Bebie | ............................ | 200/5 A |
| 4,540,865 A * | 9/1985 | Calder | ............................ | 200/512 |
| 4,839,474 A * | 6/1989 | Hayes-Pankhurst et al. | . | 200/5 A |
| 4,937,408 A * | 6/1990 | Hattori et al. | ................. | 200/314 |
| 5,286,037 A | 2/1994 | Ghaly | | |
| 5,397,867 A * | 3/1995 | Demeo | ............................ | 200/5 A |
| 5,413,486 A * | 5/1995 | Burrows et al. | ................. | 434/317 |
| 5,510,782 A * | 4/1996 | Norris et al. | ....................... | 341/22 |
| 5,564,702 A | 10/1996 | Meffert | ...................... | 273/153 R |
| 5,573,107 A * | 11/1996 | Nakano et al. | ................. | 200/314 |
| 5,655,826 A * | 8/1997 | Kouno et al. | .................... | 362/24 |
| 5,713,458 A * | 2/1998 | Johnson et al. | ................ | 200/314 |
| 5,743,796 A * | 4/1998 | Orak et al. | ........................ | 463/9 |
| 5,748,737 A * | 5/1998 | Daggar | .......................... | 705/41 |
| D400,936 S | 11/1998 | Wagner | | |
| 5,855,513 A | 1/1999 | Lam | | |
| 5,911,317 A * | 6/1999 | Tsai | ............................. | 200/514 |
| 5,971,557 A * | 10/1999 | Kubes et al. | ..................... | 362/24 |
| 5,991,749 A * | 11/1999 | Morrill, Jr. | ......................... | 705/44 |
| 6,010,339 A * | 1/2000 | McDonald | ..................... | 434/258 |
| 6,029,042 A * | 2/2000 | Yaron-Moallim | ............ | 434/309 |
| 6,060,672 A * | 5/2000 | Sugihara | ........................ | 200/61.1 |
| 6,068,183 A * | 5/2000 | Freeman et al. | ............... | 235/375 |
| 6,084,190 A * | 7/2000 | Kenmochi | ..................... | 200/341 |
| 6,227,369 B1 * | 5/2001 | Glassman | ....................... | 206/469 |
| 6,402,039 B1 * | 6/2002 | Freeman et al. | ............... | 235/492 |
| 6,462,294 B2 * | 10/2002 | Davidson et al. | .............. | 200/512 |
| 6,463,257 B1 * | 10/2002 | Wood | ............................. | 434/308 |
| 6,467,924 B2 * | 10/2002 | Shipman | ........................ | 362/600 |
| 6,533,436 B2 | 3/2003 | Krietzman et al. | | |
| D501,231 S | 1/2005 | Rom | | |
| 6,848,992 B2 | 2/2005 | Adams | | |
| 6,849,226 B2 * | 2/2005 | Ardrey et al. | .................. | 264/514 |
| 6,882,824 B2 * | 4/2005 | Wood | ............................. | 434/308 |
| 7,053,799 B2 * | 5/2006 | Yu et al. | ........................... | 341/31 |
| 7,055,740 B1 * | 6/2006 | Schultz et al. | ................... | 235/381 |
| 7,070,349 B2 * | 7/2006 | Dombrowski et al. | ........ | 400/490 |
| 7,087,847 B2 * | 8/2006 | Parkinson et al. | ............ | 200/5 A |
| 7,184,747 B2 * | 2/2007 | Bogat | ............................ | 455/406 |
| 7,264,155 B2 | 9/2007 | Halbur et al. | | |
| 7,290,713 B2 * | 11/2007 | Dean et al. | ..................... | 235/487 |
| 7,290,714 B2 | 11/2007 | Halbur et al. | | |
| 7,328,850 B2 | 2/2008 | Sines | | |
| 7,374,481 B2 | 5/2008 | Rehkemper et al. | | |
| 7,375,381 B2 | 5/2008 | Shimizu et al. | | |
| 7,376,564 B2 | 5/2008 | Selg et al. | | |
| 7,379,720 B2 * | 5/2008 | Klinghult et al. | ........... | 455/157.2 |
| 7,434,735 B2 | 10/2008 | Dean et al. | | |
| 7,520,428 B2 | 4/2009 | Ishikawa | | |
| 7,677,458 B2 | 3/2010 | Lindahl et al. | | |
| 7,689,508 B2 * | 3/2010 | Davis et al. | ..................... | 705/39 |
| 7,770,802 B2 | 8/2010 | Dean et al. | | |
| 7,815,108 B2 * | 10/2010 | Schacherer et al. | ........... | 235/380 |
| 7,828,207 B2 | 11/2010 | Cooper | | |
| 7,871,013 B2 * | 1/2011 | Schumann et al. | ........... | 235/492 |
| 8,011,577 B2 * | 9/2011 | Mullen et al. | ................... | 235/380 |
| 8,019,451 B2 * | 9/2011 | Smith et al. | ..................... | 700/94 |
| 8,060,228 B2 * | 11/2011 | Smith et al. | ..................... | 700/94 |
| 8,091,781 B2 | 1/2012 | Albrecht et al. | | |
| 8,100,333 B2 * | 1/2012 | Reynolds et al. | .............. | 235/487 |
| 8,129,640 B2 * | 3/2012 | Liao | ................................ | 200/314 |
| 8,342,412 B2 * | 1/2013 | Schacherer et al. | ........... | 235/487 |
| 8,364,587 B2 * | 1/2013 | Nuzum et al. | ................... | 705/39 |
| 8,411,038 B2 * | 4/2013 | Adams et al. | ................... | 345/168 |
| 8,434,687 B2 * | 5/2013 | Halbur et al. | ................... | 235/487 |
| 8,463,184 B2 * | 6/2013 | Dua | ................................ | 455/41.2 |
| 2001/0048379 A1 * | 12/2001 | Kaikuranta et al. | ........... | 341/22 |
| 2002/0181710 A1 * | 12/2002 | Adam et al. | ..................... | 380/270 |
| 2004/0238625 A1 * | 12/2004 | Walker et al. | .................. | 235/380 |
| 2006/0135265 A1 | 6/2006 | Hall et al. | ........................ | 463/46 |
| 2006/0157555 A1 * | 7/2006 | Dean et al. | ...................... | 235/381 |
| 2007/0255652 A1 * | 11/2007 | Tumminaro et al. | ........... | 705/39 |
| 2007/0255653 A1 * | 11/2007 | Tumminaro et al. | ........... | 705/39 |
| 2007/0265984 A1 * | 11/2007 | Santhana | ......................... | 705/65 |
| 2008/0119952 A1 * | 5/2008 | Smith et al. | ..................... | 700/90 |
| 2008/0192300 A1 | 8/2008 | Kenji | | |
| 2009/0037275 A1 * | 2/2009 | Pollio | ............................. | 705/14 |
| 2009/0099674 A1 * | 4/2009 | Smith et al. | ..................... | 700/94 |
| 2009/0108064 A1 * | 4/2009 | Fernandes et al. | .............. | 235/380 |
| 2009/0112748 A1 * | 4/2009 | Schacherer et al. | ............ | 705/35 |
| 2009/0240625 A1 * | 9/2009 | Faith et al. | ....................... | 705/65 |
| 2009/0308920 A1 | 12/2009 | Holt et al. | | |
| 2010/0170946 A1 | 7/2010 | Lindahl et al. | | |
| 2011/0024498 A1 | 2/2011 | Schacherer et al. | | |
| 2011/0180377 A1 * | 7/2011 | Liao | ................................ | 200/314 |

OTHER PUBLICATIONS

"Peel-A-Deal® Bar Coded Card," http://www.peeladeal.com/products.php?code=pad_barcode&prod=Bar%20Coded%20Card, available at least as early as Aug. 27, 2009 (3 pages).

"Go-Tag™ Solution," firstdata.com, 2008 (2 pages).

"Contactless Payments: Consumer Trends and Usage Preferences," firstdata.com, 2008 (2 pages).

\* cited by examiner

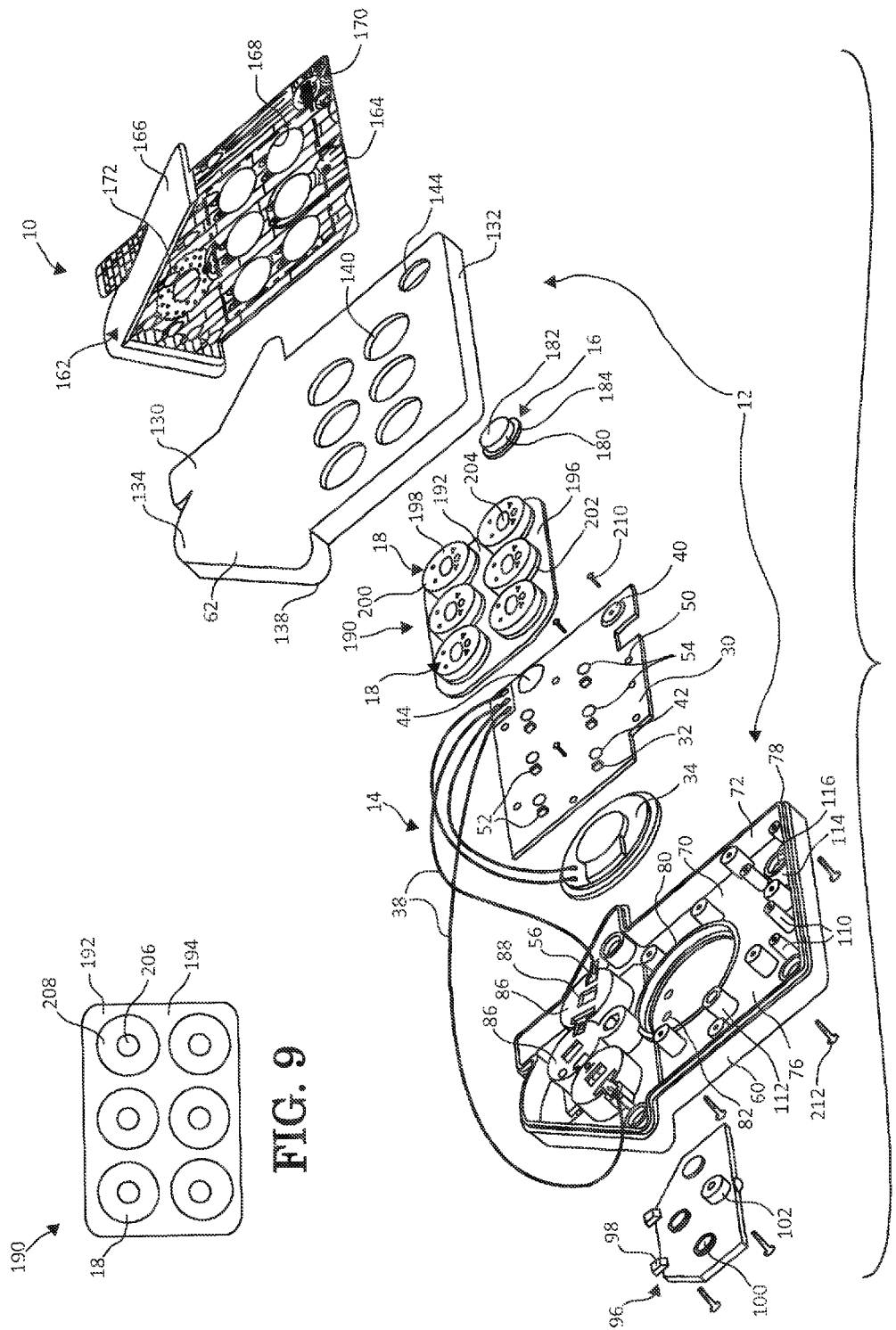

US 8,647,203 B2

TRANSACTION PRODUCT WITH SELECTIVELY ILLUMINATED BUTTONS

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the bearer's purse or wallet, serving as an advertisement or reminder to revisit the associated retailer. Gift cards and other transaction cards provide a number of advantages to both the consumer and the retailer

SUMMARY OF THE INVENTION

One aspect of the present invention relates to a transaction product including an electrical assembly, a housing, a button, and an account identifier. The electrical assembly includes a light. The housing substantially encloses the electrical assembly including the light, wherein the housing defines an exterior surface and an aperture extending through the exterior surface. The button has a rounded extremity and extends from within the housing to outside the housing through the aperture and beyond the exterior surface. The button aligns with and surrounds the light such that when the light is lit the button is illuminated. The account identifier is coupled to the housing and links the transaction product to a financial account having an associated monetary value available toward a price of a purchase, wherein the account identifier is machine readable. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 8 is an exploded, perspective view illustration of the transaction product of FIG. 1, according to one embodiment of the present invention.

FIG. 9 is a rear view of a button interface member of the transaction product of FIG. 8, according to one embodiment of the present invention.

DETAILED DESCRIPTION

Figure 1:
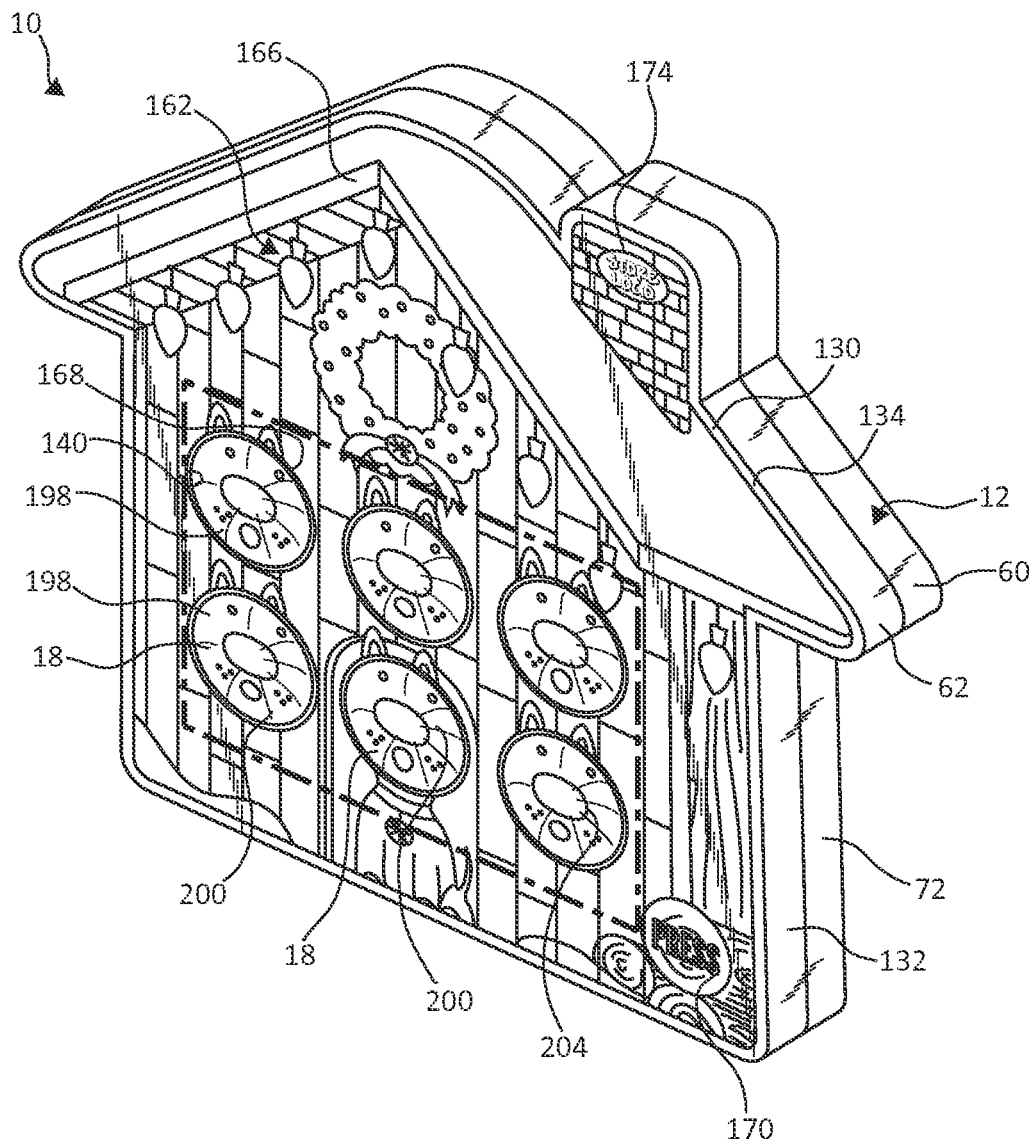
FIG. 1 is a front, top perspective view illustration of a transaction product, according to one embodiment of the present invention.
Figure 2:
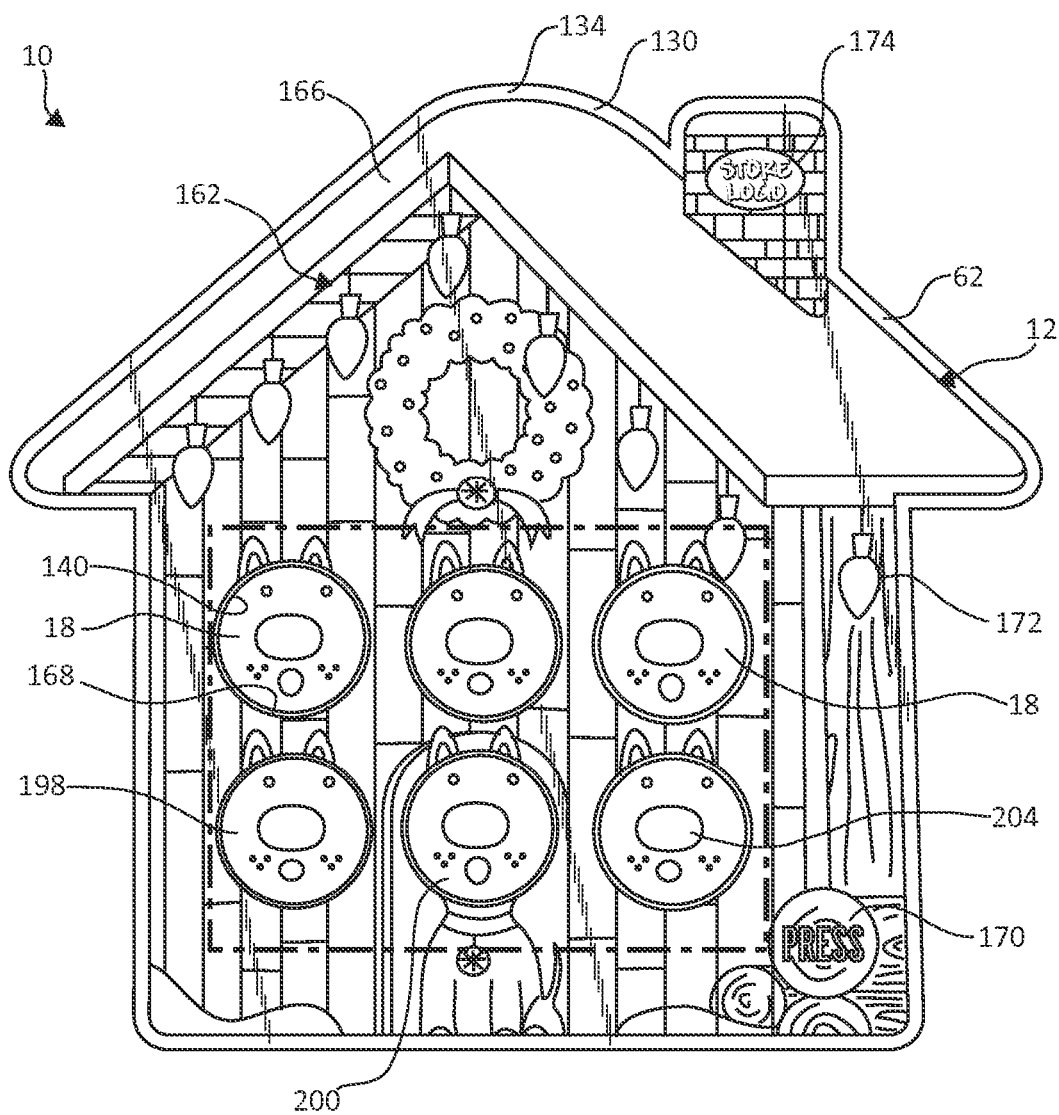
FIG. 2 is a front view illustration of the transaction product of FIG. 1, according to one embodiment of the present invention.

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with a variable visual presentation, which, in one embodiment, is provided with an accompanying audio and/or visual presentation and bearer interaction or game scenarios.

More specifically, in one example, the transaction product provides an array of light up buttons. The buttons in the array are randomly lit one at a time, and each lit button indicates to a bearer of the transaction product that the lit button should be pressed or pushed. When the correct button is pushed under an allowed time period, then another one of the buttons in randomly lit and so on and so forth. If a bearer pushes an incorrect button that is a button different than the button that is lit and/or fails to push the correct button in the allowed time period, a predetermined number of times (e.g., three times), the game terminates. In one embodiment, more than one level of the game is included and each level decreases the allowed time period and/or increases the speed at which different buttons in the array of buttons are lit such that difficulty of the game is increased.

Turning to the figures, FIGS. 1-8 illustrate one embodiment of a transaction product 10 such as a stored-value product (e.g., gift card, phone card, etc.), credit product, etc., according to the present invention. Transaction product 10 is configured to be used toward the purchase and/or use of goods and/or services and includes an enclosure or housing 12, an electrical assembly 14 (e.g., FIG. 8), an activation button 16 (e.g., FIG. 8), and a plurality of game interface buttons 18. In one embodiment, electrical assembly 14 is enclosed within housing 12, and activation button 16 and the plurality of game interface buttons 18 are each at least partially positioned within housing 12 and configured to interact with electrical assembly 14. In particular, in one example, upon bearer interaction with activation button 16 (e.g., pressing, switching or other suitable movement of activation button 16), electrical assembly 14 is activated to automatically indicate a reading on meter 18 depicted by transaction product 10.

Transaction product 10 includes an account identifier 20 (e.g., FIG. 3) such as a bar code, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic devices on transaction product 10 itself. Accordingly, by scanning account identifier 20, the account or record linked to transaction product 10 is identified and can subsequently be activated, have amounts debited therefrom and/or have amounts added thereto.

In one embodiment, account identifier 20 includes a character string or code 22 (e.g., a number and/or letter string) configured to provide additional security to the bearer of transaction product 10 and/or configured to be read by a bearer of transaction product 10 to facilitate use of transaction product 10 for web site or other purchases outside of brick-and-mortar type retail establishments. With the above in mind, account identifier 20 is one example of means for linking transaction product 10 with an account or record, and scanning of account identifier 20 is one example of means for activating or loading value on transaction product 10.

Referring to the exploded perspective view of FIG. 8, in one embodiment, electrical assembly 14 includes a printed circuit board (PCB) 30, lights 32, a speaker 34, one or more power sources or batteries 36, one or more wires 38, an activation switch 40, a plurality of first electrical contact pads 42, and an integrated circuit 44. In one embodiment, lights 32 are each mounted to PCB 30 in a desired array, for example, two rows of three, as illustrated, and are each placed in electrical communication with at least integrated circuit 44, which is also mounted on PCB 30, in one embodiment, with wiring or in any other suitable manner. In one example, each light 32 is a light emitting diode (LED) or other suitable light member. In one embodiment, PCB 30 includes electrical traces, one or more resistors, one or more capacitors and/or any suitable number of other electrical components (not shown) facilitating the proper function of electrical assembly 14 and/or electrical connection of electrical components mounted on PCB 30 as will be apparent to one of skill in the art upon reading the present application.

In one example, speaker 34 and batteries 36 are not mounted to PCB 30 but rather are electrically coupled to PCB 30 via wires 38 or other suitable electrical coupling device in electrical communication with integrated circuit 44 or other suitable component. Speaker 34 is any suitable speaker capable of converting electrical impulses into sound waves perceivable by the bearer of transaction product 10, e.g., the customer and/or recipient. Electrical assembly 14 with speaker 34 is one example of means for generating sound or an audio signal with transaction product 10.

In one embodiment, each battery 36 is an alkaline battery or any other suitable battery (e.g. a mercury free battery). In one embodiment, during periods of non-use of electrical assembly 14, the amount of power provided by batteries 36 to other components of electrical assembly 14 is decreased to prolong the overall functional life span of electrical assembly 14. In one embodiment, an activation switch 40 is included on PCB 30 or otherwise and is configured to initiate power flow from batteries 36 to a remainder of electrical assembly 14 and/or to perform a particular generally non-transactional function, such as to initiate a gaming session as will be further described below, upon bearer interaction with activation switch 40. In one embodiment, activation switch 40 is a snap or pressure sensitive domed switch mounted to PCB 30. More specifically, interaction with activation switch 40 serves to close a connection within electrical assembly 14 and to activate electrical assembly 14 to perform a task or function corresponding with activation switch 40, as will be further described below.

In one embodiment, part of traces, etc. defined by PCB 30 includes a plurality of first electrical contact pads 42 arranged in a substantially identical and slightly offset array 54 as compared to lights 32. In one example, each first electrical contact pad 42 corresponds with one of lights 32. Upon closing a circuit or otherwise interacting with the first electrical contact pads 42, as will be further described below, a bearer will be informed if she interacted with the appropriate one of first electrical contact pads 42 that corresponds to a currently or recently lit light 32. According to one embodiment, integrated circuit 44 controls the workings of electrical assembly 14 especially with respect to executing a gaming session, as will also be further described below. Other arrangements of the components of electrical assembly 14 will be apparent to those of skill in the art upon reading the present application.

In one example, PCB 30 defines one or more apertures 50 sized, shaped, and positioned to receive features of housing 12, as will further be described below, to facilitate alignment, positioning and/or coupling of PCB 30 to housing 12 or other components of transaction product 10. Although primarily described herein as including a single PCB 30, upon reading this application, one of ordinary skill in the art will recognize that multiple printed circuit boards may be utilized wherein the multiple printed circuit boards and/or the components mounted thereon are electrically coupled to one another.

During assembly of electrical assembly 14, in one embodiment, each of lights 32 is coupled to and configured to extend from a front surface of PCB 30, and lights 32 are arranged to collectively define an array 52 of lights 32. One of first electrical contact pads 42 is positioned near each light 32 such that electrical contact 54 are also arrange in an array 54 similar to array 52 of lights 32. Batteries 36 are coupled to PCB 30 and placed in electrical communication with lights 32 such that batteries 36 can selectively provide power thereto. In one embodiment, battery contact plates 56 are placed in communication with batteries 36 and facilitate receiving power therefrom. Activation switch 40 is placed in electrical assembly 14, e.g., on PCB 30 and is configured to at least partially close electrical assembly 14 to allow power from power source(s) 36 to reach lights 32, integrated circuit 44, and/or speaker 34 as necessary. In one embodiment, activation switch 40 alternatively or additionally signals electrical assembly to initiate a gaming session.

Figure 11:
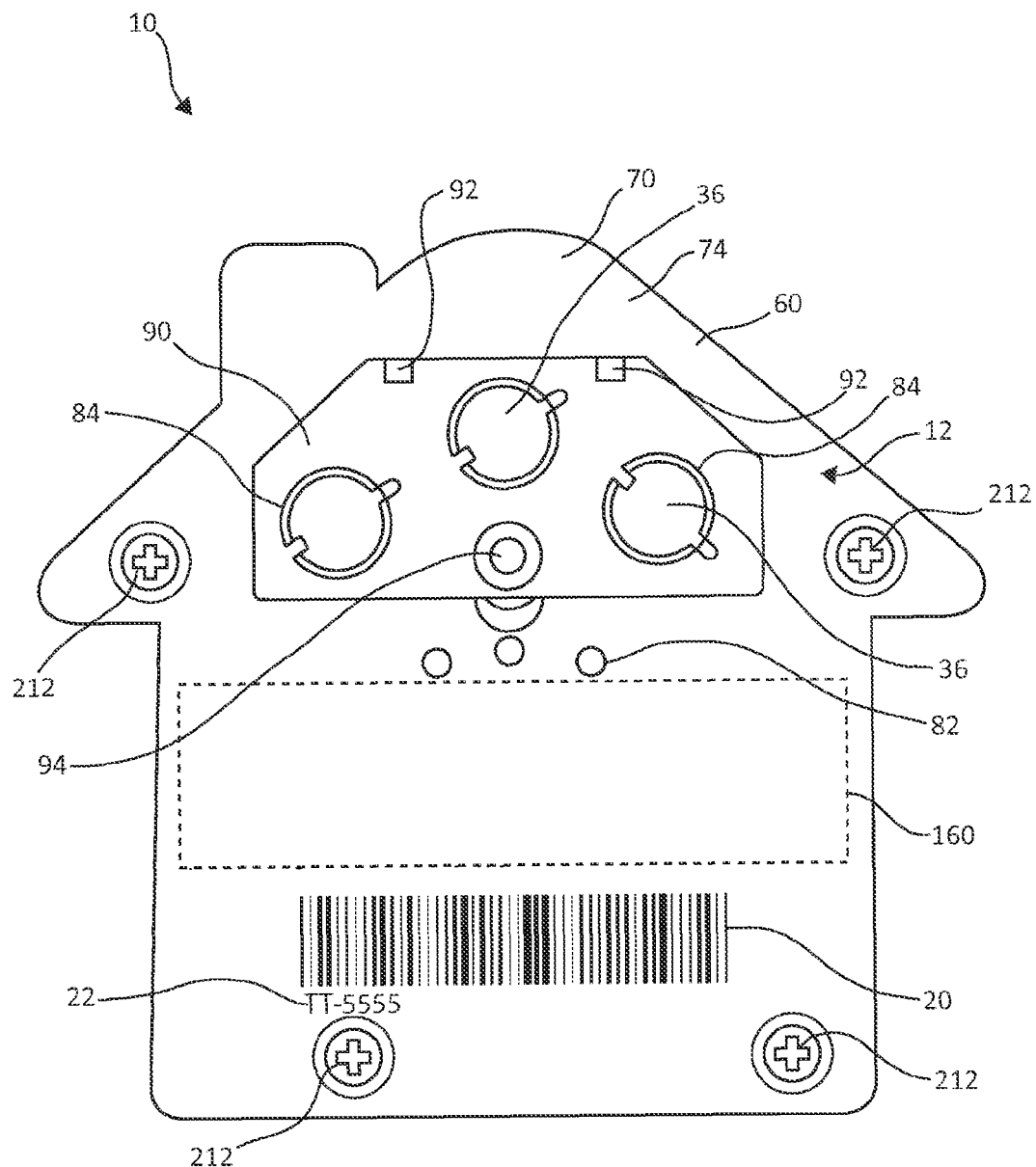
FIG. 11 is a rear view of the transaction product of FIG. 1 with a battery compartment cover removed, according to one embodiment of the present invention.

In one embodiment, housing 12 includes a first support or housing member 60 and a second support or housing member 62. In one embodiment, first housing member 60 is a base, and second housing member 62 is a cover. In one embodiment, base 60, as described primarily with reference to FIGS. 3, 8, and 11, generally includes a primary wall or primary panel 70 and a side panel or sidewall 72. Primary panel 70 is generally planar and defines an exterior surface 74 (e.g., FIG. 3) and an interior surface 76 (e.g., FIG. 8) opposite exterior surface 74. In one embodiment primary panel 70 is shaped similarly to corresponding footprint similar to a house (e.g., a dog house) with basic structure, roof, and/or chimney portions. However, primary panel 70 can take on any other suitable shape (e.g., square, rectangle, circle, oval, star, cloud, automobile, animal, character, logo-based, etc. shape) as will be apparent to those of skill in the art upon reading the present application.

Sidewall 72 extends from interior surface 76 away from exterior surface 74 and, in one example, substantially about an entire perimeter of primary panel 70. In one embodiment, sidewall 72 extends with a generally perpendicular orientation relative to primary panel 70. Sidewall 72 extends from primary panel 70 to define an inside edge 78 configured to more securely mate with cover 62 as will be apparent to those of skill in the art upon reading this application.

In one embodiment, a speaker rim 80 (e.g., FIG. 8) extends from interior surface 76 of primary panel 70 to define a speaker reception cavity sized and shaped to receive speaker 34 of electrical assembly 14. Speaker rim 80 facilitates proper original placement and helps maintained correct prolonged placement of speaker 34 relative to housing 12. In one embodiment, speaker apertures 82 extend through primary panel 70 within speaker reception cavity and are configured to facilitate transmission of sound from the confines of speaker rim 80 to observers outside housing 12.

According to one embodiment, base 60 additionally defines battery cavities 84 each configured to receive and maintain one of batteries 36 of electrical assembly 14. Each battery cavity 84 extends inwardly from a battery chamber recess 90, which is defined by base 60 and extends inwardly from exterior surface 74 of primary panel 70, to define a inner most panel 86 of battery cavity 84. In one example, innermost panel 86 defines apertures and slots for receiving battery contact plates 56 such that batteries 36 placed in battery cavities 84 electrically interface with battery contact plates 56, which, in turn, are coupled to integrated circuit 44 and a remainder of electrical assembly 14 via wires 38 and PCB 30.

In one embodiment, base 60 includes a door 96 sized and shaped to fit within and/or substantially cover battery chamber recess 90, thereby enclosing batteries 36. In one embodiment, battery chamber recess 90 defines one or more apertures 92 configured to receive one or more flanges 98 extending from door 96 to facilitate alignment of door 96 with and coupling of door 96 within battery chamber recess 90. In one example, battery chamber recess 90 includes a coupling aperture 94 opposite the one or more apertures 92 and door 96 includes a coupling protrusion 102 configured to align with coupling aperture 94 such that a door fastening device 104 (FIG. 3), such as a screw, rivet, or other suitable device can pass through each of the one or more apertures 92 and a corresponding coupling aperture 94 to hold door 96 securely within battery chamber recess 90. In one example, protrusions 100 extend from inside door 96 and are each configured to interface with one of batteries 36 to provide pressure to the corresponding one of batteries 36 to help maintain each battery 36 within its respective battery cavity 84 and in contact with battery contact plates 56.

Various features extend from interior surface 76 of primary panel 70 of base 60. For example, alignment protrusions 10 or internal walls extend from interior surface 76 of primary panel 70 in a direction substantially parallel to sidewall 72. In one example, each alignment protrusion 10 is configured to receive a corresponding opening, cutout, or aperture of PCB 30, as will be further described below, to facilitate alignment of PCB 30 within housing 12. In one example, base 60 alternatively or additionally includes spacing protrusions 112, which extend inwardly from interior surface 76 of primary panel 70 and interface with PCB 30 or other member to maintain their position and spacing with respect to interior surface 76 of primary panel 70. In one embodiment, coupling protrusions 114 are formed by base 60 and each have a cavity 116 extending therethrough and through to exterior surface 74 of primary panel 70 in a manner configured to receive a housing closing fastener 212, such as a screw, rivet, or other suitable member or device. Other features configured to facilitate alignment and coupling of base 60 and cover 62 are also contemplated.

One embodiment of cover 62 is illustrated with reference to FIGS. 1, 2, 8, and 10. Cover 62, according to one embodiment, includes a primary panel 130 and a sidewall 132. Primary panel 130 is generally planar and defines an exterior surface 134 (e.g., FIGS. 1, 2, and 8) and an interior surface 136 (e.g., FIG. 10) opposite exterior surface 134. In one embodiment, primary panel 130 is generally sized similar to primary panel 70 of base 60. Sidewall 132 extends from interior surface 136 about a substantial entirety of a perimeter of primary panel 130. For example, sidewall 132 extends with a generally perpendicular orientation relative to primary panel 130. Sidewall 132 extends from primary panel 130 to collectively form an inside edge 138 opposite primary panel 130. In one embodiment, inside edge 138 is a stepped edge configured to securely mate with inside edge 78 of base 60.

In one embodiment, interface button apertures 140 and activation button aperture 144 extend through primary panel 130. Each interface button aperture 140 is sized and shaped to receive one of game interface buttons 18 and, therefore, in one embodiment button apertures 140 are arranged in an array corresponding to game interface buttons 18. In one embodiment, a raised rim 142 extends away from interior surface 136 generally around a perimeter of each interface button aperture 140. In one example, interface button apertures 140 and the corresponding raised rims 142 are positioned to correspond or align with the positioning of electrical assembly 14, more specifically, with electrical contact pads 42 of electrical assembly 14, as will be further described below. In one example, cover 62 includes an activation aperture rim 146, which is similar to raised rim 142, extending around a perimeter of activation button aperture 144.

In one embodiment, cover 62 defines one or more coupling protrusions 148 each configured to align with and fit adjacent to one of coupling protrusions 114 of base 60. When coupling protrusions 114 and 148 are aligned, one housing closing fastener 212 is positioned to extend though each aligned pair of coupling protrusions 114 and 148 to secure cover 60 to base 62. In one embodiment, each of the one or more coupling protrusions 148 includes a cavity 150 extending therethrough to facilitate receipt of closing fastener 212.

In one embodiment, each of base 60 and cover 62 is formed by injection molding plastic (e.g., polycarbonate, polystyrene, polyvinyl chloride (PVC), acrylonitrile butadiene styrene (ABS), polyethylene terephthalate (PET), teslin, polyactide (PLA) and acrylic), or other suitable material to define the various attributes of base 60 and cover 62. Other methods of forming base 60 and cover 62 are also contemplated. Although specific features are described with respect to each of base 60 and cover 62, one of skill in the art will recognized after reading this application that features described with respect to base 60 may additionally or alternatively be included in cover 62 and vice versa.

Figure 3:
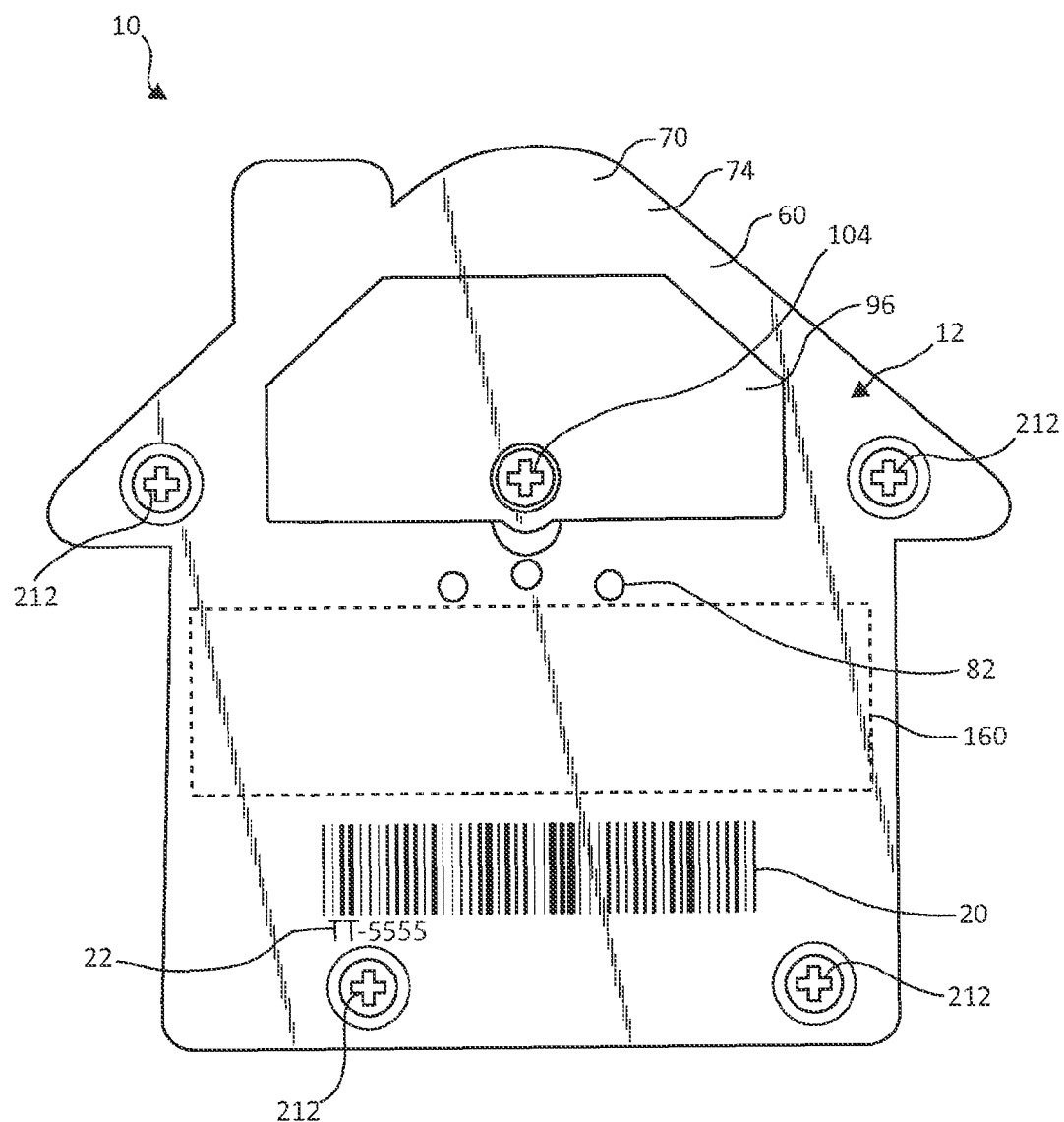
FIG. 3 is a rear view illustration of the transaction product of FIG. 1, according to one embodiment of the present invention.
Figure 4:
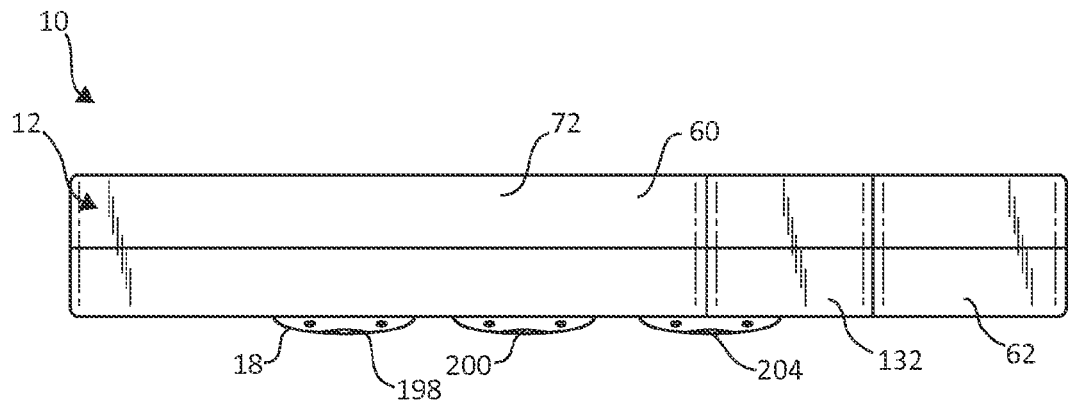
FIG. 4 is a top view illustration of the transaction product of FIG. 1, according to one embodiment of the present invention.
Figure 5:
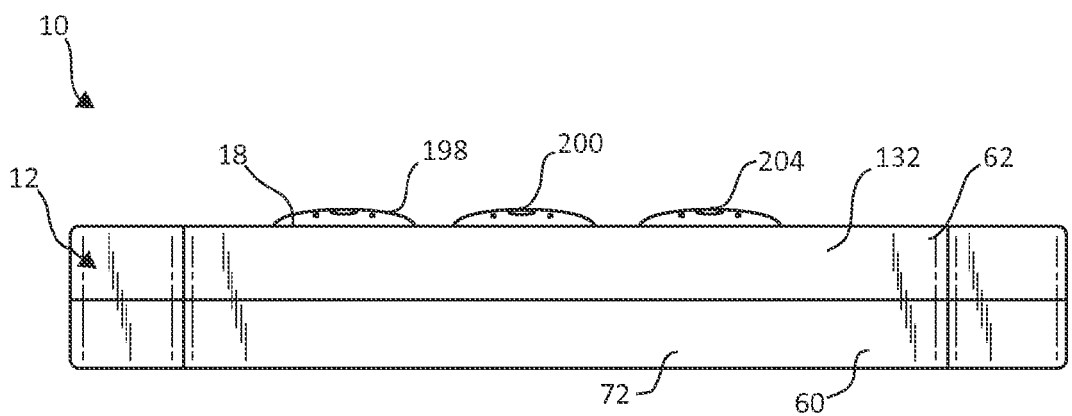
FIG. 5 is a bottom view illustration of the transaction product of FIG. 1, according to one embodiment of the present invention.
Figure 6:
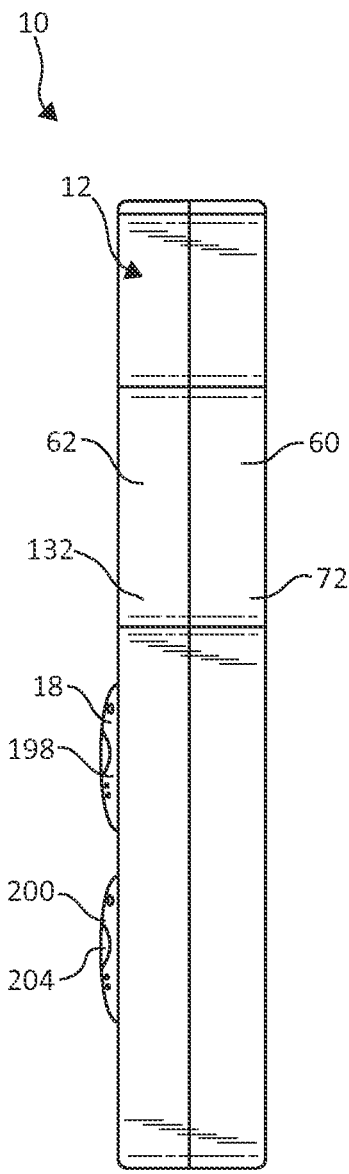
FIG. 6 is a right side view illustration of the transaction product of FIG. 1, according to one embodiment of the present invention.
Figure 7:
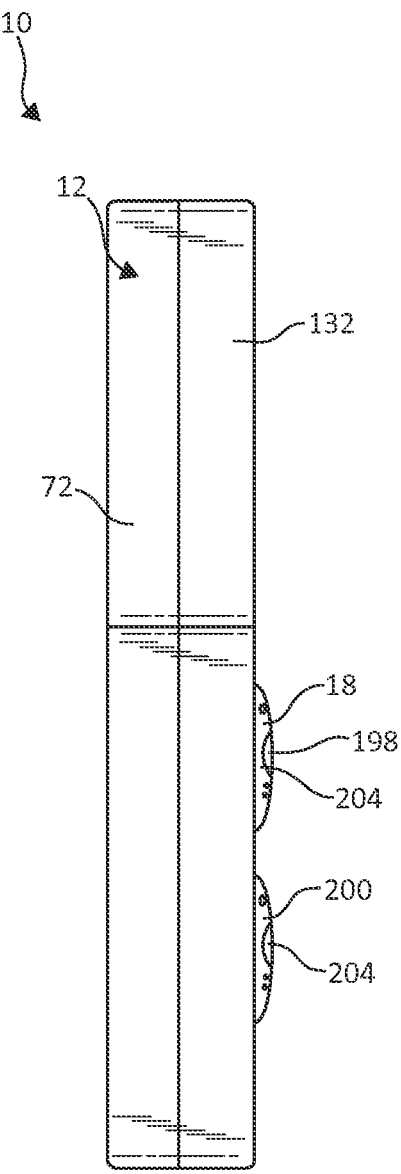
FIG. 7 is a left side view illustration of the transaction product of FIG. 1, according to one embodiment of the present invention.
Figure 10:
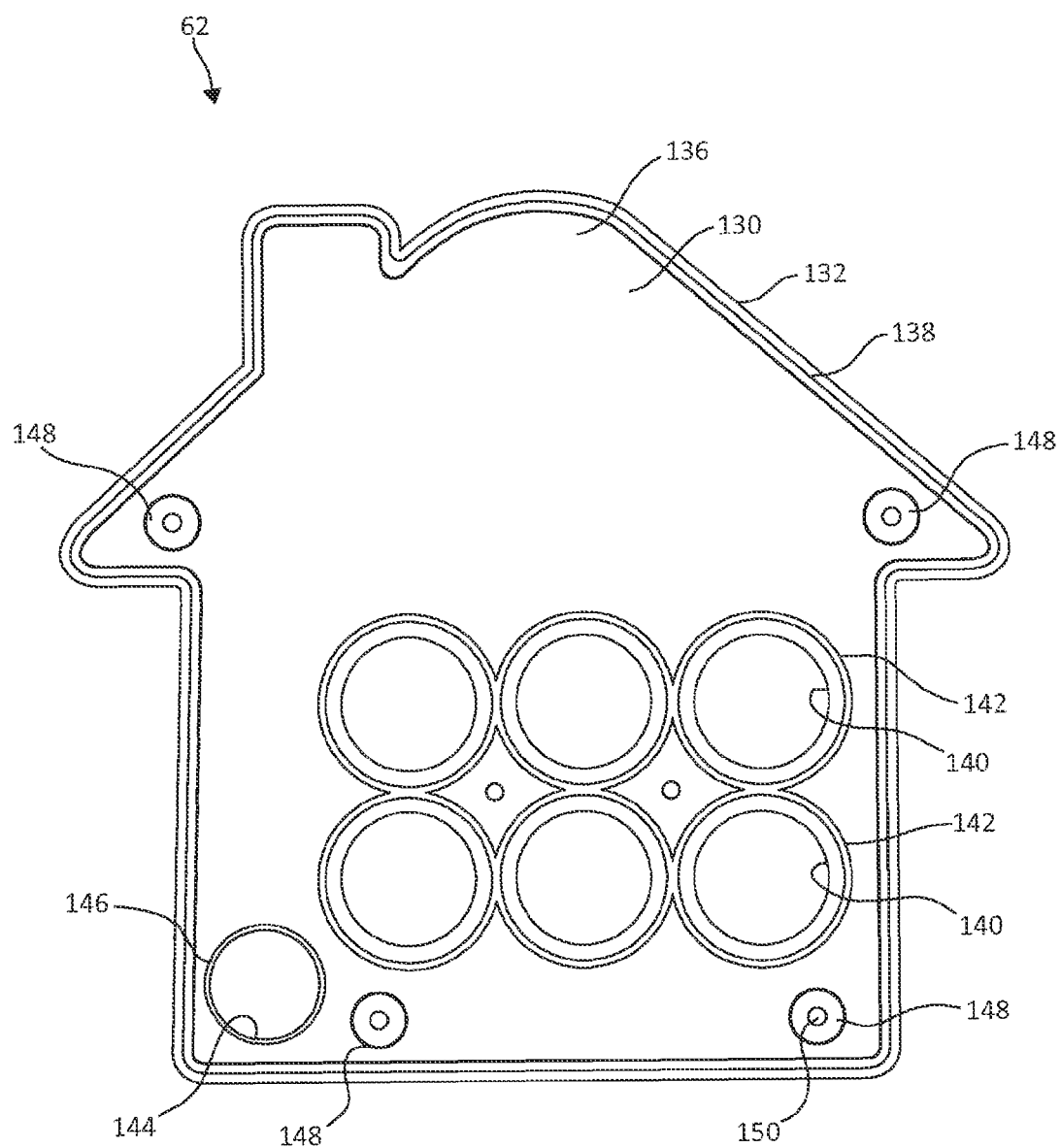
FIG. 10 is a rear view of a front housing member of the transaction product of FIG. 1, according to one embodiment of the present invention.

In one embodiment, redemption indicia 160, which are generally indicated with a dashed line box in FIG. 3, are included on transaction product 10, for example, on one or both of exterior surface 74 of base 60 and exterior surface 134 of cover 62. In one embodiment, account identifier 20 and redemption indicia 160 are both included on the same one of exterior surface 74 of base 60 and exterior surface 134 of cover 62. Redemption indicia 160 indicate that transaction product 10 is redeemable for the purchase of goods and/or services and that, upon use, a value of the purchased goods and/or services will be deducted from the financial account or record linked to transaction product 10. In one embodiment, redemption indicia 160 include phrases such as "<NAME OF STORE>GiftCard" and "This GiftCard is redeemable for merchandise or services at any of our stores or at our web site," and/or provides help or phone line information in case of a lost, stolen or damaged stored-value card, etc. In one embodiment, in which housing 12 is formed by injection molding, account identifier 20, redemption indicia 160, and one or more of any other indicia or information on transaction product 10 are printed onto exterior surface 74 or exterior surface 134 of housing 12.

Referring once again to FIGS. 1, 2, and 8, a face panel 162 is optionally coupled to housing 12, for example to exterior surface 134 of cover 62. In one embodiment, face panel 162 is generally planar and is formed of paper, plastic or other suitable material. Face panel 162 includes a first or exposed surface 166 and a second or internal surface 164. Exposed surface 166 includes printed indicia such as decorative indicia 172, brand indicia 174, and an activation area or button indicator 170. In one embodiment, decorative indicia 172 relate to a particular occasion, such as a wedding, new baby, graduation, holiday, season, brand identifier, media format identifier or other visual design to promote purchase of transaction product 10. Brand indicia 174 identify a brand associated with transaction product 10 such as identifying a product brand, a store brand, department, etc. having some association with transaction product 10.

Internal surface 164 of face panel 162 is configured to interface with cover 62, more specifically, exterior surface 134 of primary panel 130 of cover 62. In one embodiment, face panel 162 is adhered to cover 62 with any suitable adhesive. In one embodiment, face panel 162 is formed on an adhesive backed plastic, paper, cardstock, etc. and is directly applied and adhered to cover 62.

In one embodiment, face panel 162 defines a plurality of interface button apertures 168 corresponding with the plurality of interface button apertures 140 through primary panel 130 of cover 62. When face panel 162 is adhered to exterior surface 134 of cover 62, the plurality of interface button apertures 168 align with the plurality of interface button apertures 140 such that neither the plurality of interface button apertures 168 nor the plurality of interface button apertures 140 are blocked by the other.

Button indicator 170 is positioned on face panel 162 to generally align with a position of activation button 16 under face panel 162 upon assembly of transaction product 10. In this respect, button indicator 170 corresponds with a location of transaction product 10 where the bearer, e.g., a customer or recipient, can interact with transaction product 10 to activate the non-transactional features of transaction product 10, in this case, electrical assembly 14. In one example, face panel 162 covers activation button 16 upon assembly of transaction product 10, and button indicator 170 not only indicates where a bearer of transaction product 10 should press transaction product 10 to interact with activation button 16, but may also instruct the bearer to interact with activation button 16 by including text or other indications such as "press," "move," "switch" or something similar thereto as will be apparent to those of skill in the art upon reading this application.

Button indicator 170 is one example of means for informing a bearer of how to initiate non-transactional use of transaction product 10, as will be further described below. Other combinations or selections of indicia to be displayed on face panel 162 are also contemplated. In an alternate embodiment, at least portions of indicia described to be included on face panel 162 are directly printed to exterior surface 134 of cover 62 or to exterior surface 74 of base 60 or vice versa. In one embodiment, exposed surface 166 of face panel 162 is printed and finished in any one of a variety of manners such as dull, matte, gloss, textured, or other effect finish.

Referring to FIG. 8, activation button 16 is illustrated according to one embodiment of the present invention. As illustrated, button 16 includes a relatively short hollow cylinder 180, an end wall 182 capping one end of hollow cylinder 180, and a rim 184 extending around hollow cylinder 180 near an end of activation button 16 opposite end wall 182. In one example, a pin (not shown) extends inwardly from activation button 16 to more accurately interface with activation switch 40 of electrical assembly 14. In one embodiment, rim 184 extends radially outwardly from hollow cylinder 180 and, therefore, has a larger diameter than hollow cylinder 180. In one embodiment, a portion of each game interface button 18 that extends outwardly beyond exterior surface 134 is rounded or domed. Hollow cylinder 180 is sized with a diameter sufficient to fit within button aperture 144. Conversely, rim 187 has a diameter greater than the overall diameter of button aperture 144 to prevent activation button 16 from falling through button aperture 144.

The plurality of game interface buttons 18 are all formed by a single interface button member 190, which is formed of a single material such a silicone, rubber, or other suitable material, according to one embodiment. In one example, single interface button member 190 includes a primary panel 192, which, in one instance, is substantially planar and defines a first surface 194 and a second surface 196 opposite the first surface 194. Protruding button heads 198 extend from second surface 196 away from first surface 194. Each protruding button head 198 includes a domed or otherwise substantially solid extremity 200 and a crush zone 202 extending from domed extremity 200 to primary panel 192. Each substantially solid extremity 200 provides the portion of protruding button head 198 that forms one of game interface buttons 18 that will extend out of housing 12 via interface button apertures 140 and is configured for repeated contact by one or more bearers of transaction product 10.

In one embodiment, in which it is desired for game interface buttons 18 to selectively be lit or illuminated by lights 32, each substantially solid extremity 200 is substantially translucent and configured to permit illumination from an adjacent light 32 therethrough. In one example substantially solid extremity 200 is additionally configured to diffuse illumination from light 32, such that a small LED light 32 is able to illuminate substantially all of substantially solid extremity 200. In one embodiment, decorative indicia 204 is printed and/or otherwise applied to an end of substantially solid extremity 200. Decorative indicia 204 correspond with decorative indicia 172 on face panel 162, in one embodiment. For example, wherein decorative indicia 172 depict a dog house, decorative indicia 204 depict a dog face, etc. Crush zone 202 extends between substantially solid extremity 200 and primary panel 192 and is substantially hollow such that an internal surface 208 of substantially solid extremity 200 is recessed outwardly from primary panel 192. In one embodiment, an electrical contact node 206 is secured to a center of internal surface 208.

Since crush zone 202 is substantially hollow, crush zone 202 effectively defines side wall portions of a thickness sufficient to maintain the structure of protruding button heads 198 and hold substantially solid extremity 200 away from primary panel 192 during inactive periods while still allowing for repeated collapse of crush zone 202 when a bearer applies finger pressure to the corresponding substantially solid extremity 200. When crush zone 202 collapses under finger pressure, internal surface 208 with electrical contact node 206 moves to primary panel 192 allowing electrical contact node 206 to interface with an associated electrical contact pad 42 of electrical assembly 14, which is aligned with the protruding button head 198, to provide a signal to electrical circuit 14, as will be further described below. In one example, the material forming single interface button member 190 is sufficiently elastic that following removal of finger pressure on substantially solid extremity 200, crush zone 202 transitions back to its inactive, non-collapsed state, once again separating electrical contact node 206 away from the corresponding electrical contact pad 42 of electrical assembly 14. Further details of the assembly of transaction product 10 will be described with reference to the flow chart of FIG. 16.

Figure 12:
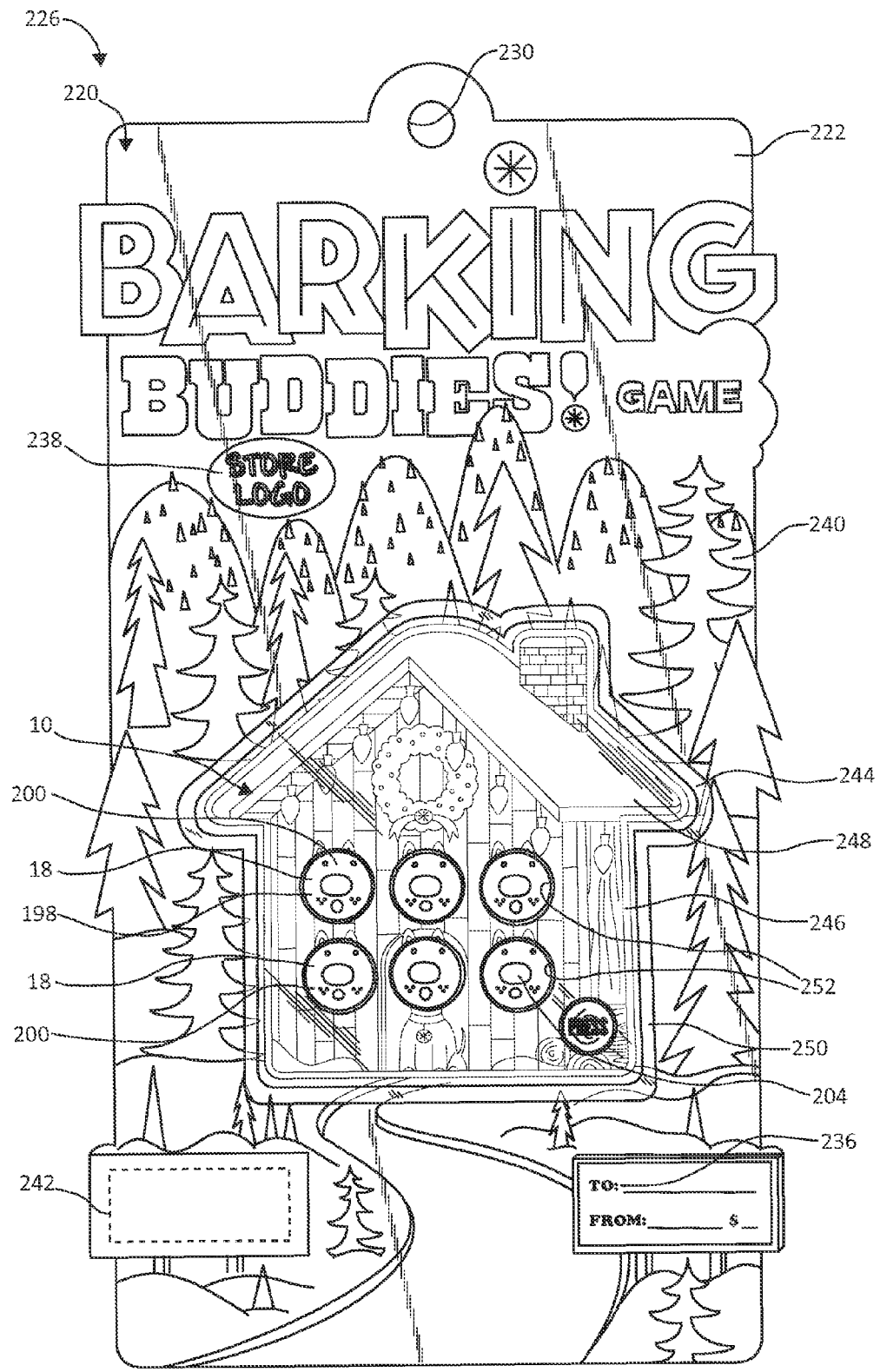
FIG. 12 is a front view illustration of a transaction product assembly including a backer, the transaction product of FIG. 1, and a blister pack, according to one embodiment of the present invention.
Figure 13:
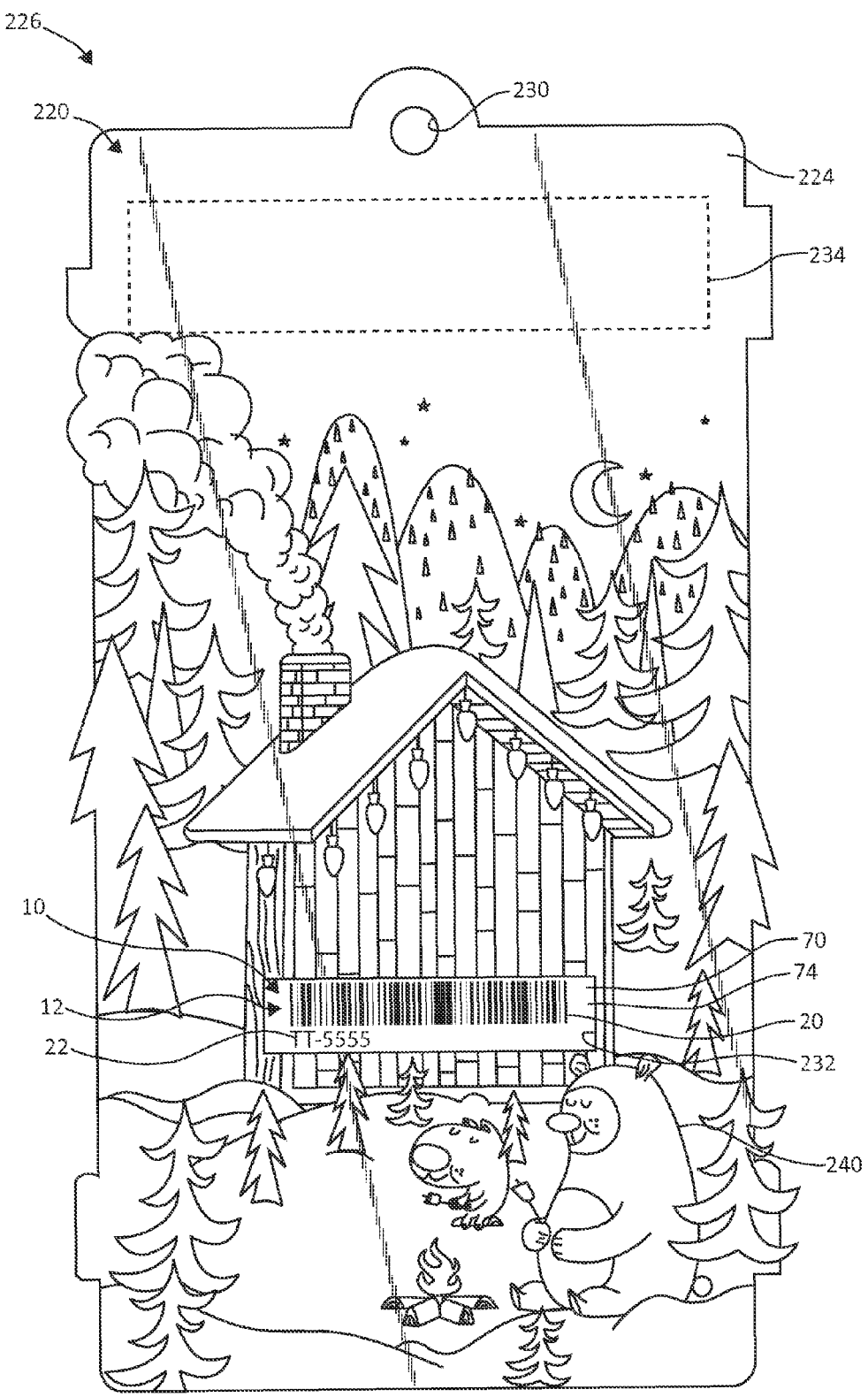
FIG. 13 is a rear view illustration of the transaction product assembly of FIG. 12, according to one embodiment of the present invention.
Figure 14:
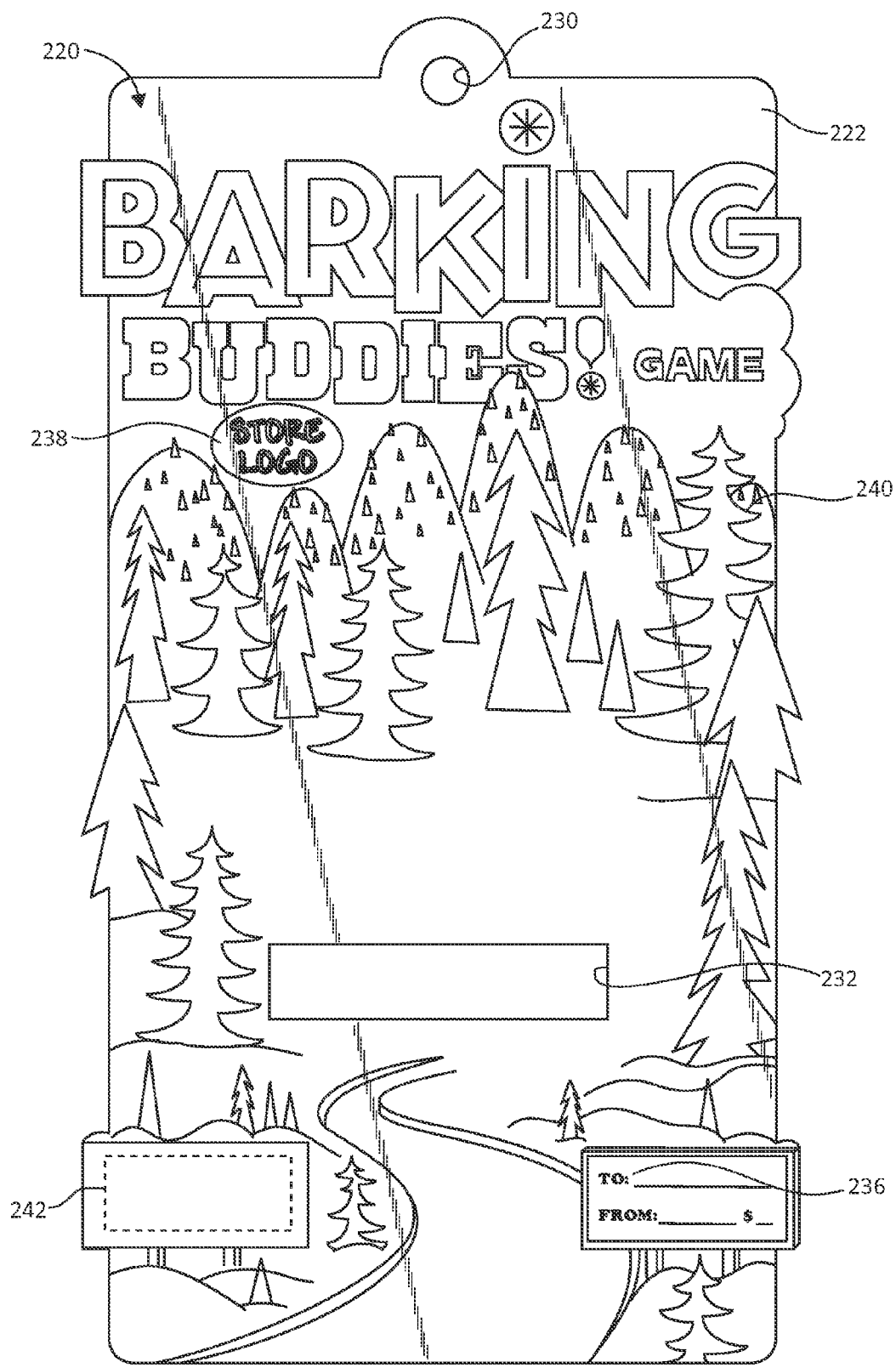
FIG. 14 is a front view illustration of the backer of FIG. 12, according to one embodiment of the present invention.
Figure 15:
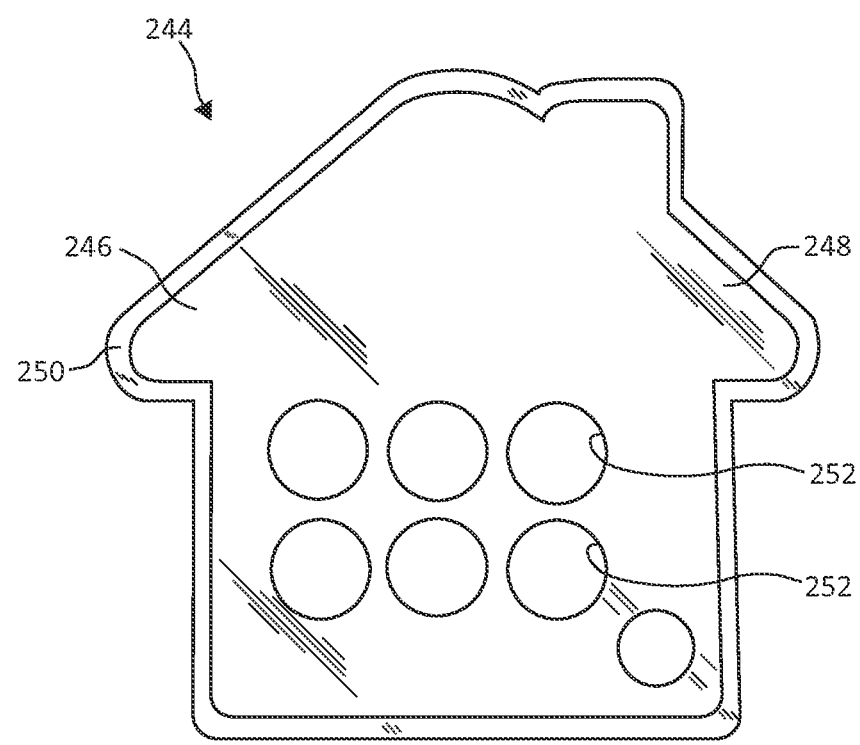
FIG. 15 is a front view illustration of the blister pack of FIG. 12, according to one embodiment of the present invention.

FIGS. 12-14 illustrate a carrier or backer 220 supporting transaction product 10 (e.g., FIGS. 1-8). Backer 220 comprises a single layer or multiple layers of paper or plastic material, for example, generally in the form of a relatively stiff but bendable/flexible card. Use of other materials is also contemplated. As such, backer 220 defines a first or front surface 222 (e.g., FIGS. 12 and 14) and a second or rear surface 224 (e.g., FIG. 13). Transaction product 10, is readily releasably attached to backer 220, for example, by adhesive, blister packaging, overlying skinning material or the like, such that transaction product 10 with backer 220 collectively defines a transaction product assembly 226. For example, a blister package 244 defines a chamber-defining portion 246 for surrounding at least five sides of transaction product 10 and a frame portion 250 extending around an entire perimeter of an open side of chamber-defining portion 246. Transaction product 10 is placed in chamber-defining portion 246 and frame portion 250 is secured to front surface 222 of backer 220 such that transaction product 10 is maintained interposed between blister package 244 and backer 220 for display and gifting purposes.

Additionally referring to FIG. 14, in one embodiment, chamber-defining portion 246 includes a front panel 248 extending substantially parallel to frame 250 and shaped similarly to and sized just slightly larger than primary panel 130 of cover 62. Front panel 248 includes a plurality of apertures 252 each sized and arranged similar to interface button apertures 140 or activation button apertures 144 of cover 62 such that each of apertures 252 is configured to allow a portion of each game interface button 18 that extends beyond exterior surface 134 of primary panel 130 of cover 62 to extends out of blister pack 244 via apertures 252 and/or exposes button indicator 170 of face panel 162. Exposing game interface buttons 18 and/or activation button 16 allows a potential consumer or other observer of transaction product 10 to interface or play with transaction product 10 to preview the non-transactional functionality of transaction product 10 before committing to purchase or activation of transaction product 10. In one embodiment, allowing a potential consumer to use non-transactional features of transaction product 10 while it is still packaged in blister pack 244 and backer 220 promotes the sale and/or activation of transaction product 10.

In one embodiment, backer 220 includes a window or opening 232 for displaying account identifier 20 of transaction product 10 through backer 220 as illustrated in FIG. 12. As previously described, account identifier 20 is adapted for accessing an account or record associated with transaction product 10 for activating, loading or debiting value from the account or record. Accordingly, in one embodiment, opening 232 allows access to account identifier 20 to activate and/or load transaction product 10 without removing transaction product 10 from backer 220. In one embodiment, backer 220 additionally includes a hanging aperture 230 for receiving a support rod or similar structure such that transaction product 10 is hung from support rod via backer 220 while on display in a retail setting or otherwise hung.

In one embodiment, backer 220 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front surface 222 and rear surface 224. In one example, the indicia include one or more of redemption indicia 234, message field indicia 236, brand indicia 238, decorative indicia 240, etc.

Redemption indicia 234, which are generally indicated with a dashed line box in FIG. 13, inform a bearer of transaction product assembly 226 that transaction product 10 is redeemable for the purchase of goods and/or services and that upon use, a value of the purchased goods and/or services will be deducted from the financial account or record linked to transaction product 10. In one embodiment, redemption indicia 234 include phrases such as "<NAME OF STORE>GiftCard" and "This GiftCard is redeemable for merchandise or services at any of our stores or at our website," and/or provides help or phone line information in case of a lost, stolen or damaged transaction product, etc.

Message field indicia 236 (e.g., FIGS. 12 and 14), for example, include "to," "from" and "amount" fields and are configured to be written to by the bearer of transaction product assembly 226 prior to presenting transaction product assembly 226 to a recipient. As such, message field indicia 236 facilitate the consumer in preparing transaction product assembly 226 for gifting to a recipient.

Brand indicia 238 identify a store, brand, department, etc. and/or services associated with transaction product 10, and in one example, are similar to any brand indicia 174 of transaction product 10. Any decorative indicia 240, which, in one example, are similar to or coordinate with indicia 90 of transaction product 10, may also be included on backer 220.

In one embodiment, instructional indicia 242 which are generally indicated with a dashed line box in FIGS. 12 and 14, are included on any one of backer 220 or transaction product 10. Instructional indicia 242 provide at least partial instructions of how to use the non-transactional features of transaction product 10 and/or promoting selection, activation, and loading of the associated transaction product 10. Any of indicia 234, 236, 238, 240, 242, or other indicia optionally may appear anywhere on backer 220 or transaction product 10. Additional information besides that specifically described and illustrated herein may also be included. Other suitable backers will be apparent to those of skill in that art upon reading this application and may or may not be configured to fold or wrap about transaction product 10.

Figure 16:
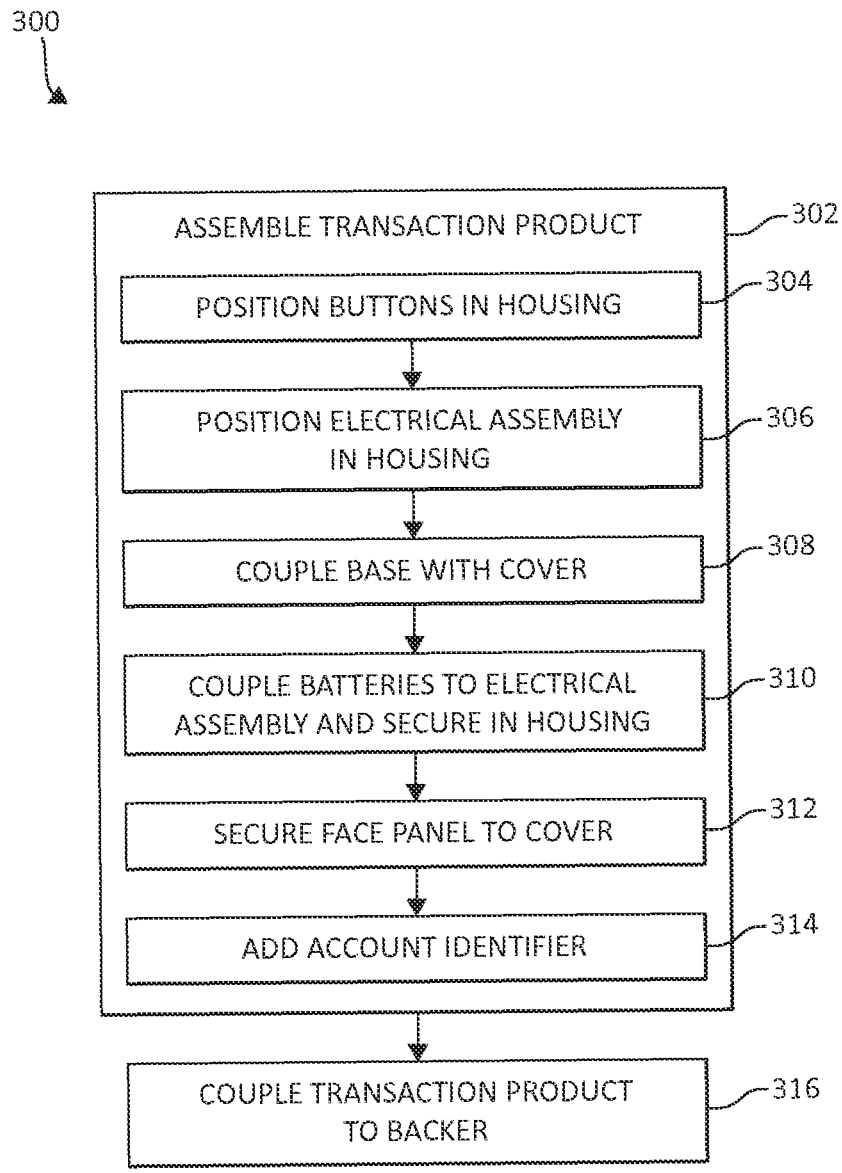
FIG. 16 is a flow chart illustrating a method of assembling the transaction product of FIG. 1, according to one embodiment of the present invention.

FIG. 16 is a flow chart illustrating one embodiment of a method 300 of assembling transaction product assembly 226 and will be described with respect to the structures of FIGS. 1-15. At 302, transaction product 10 is assembled. It should be understood that the order of operations that make up assembly transaction product 10 is one example sequence. One of skill in the art will recognize alternative orders for operations upon reading this application. In one embodiment, assembling transaction product 10 at 302 begins with placing activation button 16 and the plurality of game interface buttons 18 in place within housing 12 at 304. More particularly, in one example, activation button 16 is moved from an interior of cover 62 at least partially through activation button aperture 144 of cover 62. Rim 184 of activation button 16 interfaces with aperture rim 146 to prevent activation button 16 from falling out of housing 12 through activation button aperture 144. In one example, activation button 16 fits through activation button aperture 144 such that end wall 182 of activation button 16 sits flush with and/or more external to exterior surface 74 of primary panel 70.

In one embodiment, operation 304 additionally includes positioning interface button member 190 relative to housing 12 such that each game interface button 18 is properly located. In particular, in one example, each protruding button head 198 is placed to extend through one of interface button apertures 140 such that primary panel 192 of interface button member 190 is maintained adjacent interior surface 136 of cover 62. In this manner, primary panel 192 interfaces with interior surface 136 in a manner that also holds each game interface button 18 in place relative to housing 12.

At 306, electrical assembly 14 is positioned in housing 12. For example, speaker 34 is positioned within speaker rim 80 adjacent interior surface 76 of base 60 to align at least partially with speaker apertures 82 formed through base 60. Speaker 34 is coupled with PCB 30 via wires 38 in the illustrated embodiment, and PCB 30 is also coupled with battery contact plates 56 via wires 38. Once speaker 34 is positioned, PCB 30 is placed over speaker 34 and, in one embodiment, is aligned such that apertures 50 in PCB 30 fit around or otherwise interface with alignment protrusions 110 of base 60. In one embodiment, PCB fastener elements 210, e.g., screws, rivets, etc., are inserted through PCB 30 and into extrusions of base 60 to securely position PCB 30 in place relative to housing 12. As described above, PCB 30 supports lights 32 in an array 52, and each light 32 is positioned adjacent a different one of electrical contact pads 42.

At 308, base 60 is coupled with cover 62, for example, such that interior edge 78 of sidewall 72 of base 60 directly mates and is secured to inside edge 138 of sidewall 132 of cover 62. Due in part to the secure positioning of electrical assembly 14 elements and activation button 16 and game interface buttons 18 to housing 12 in operation 306, securement of base 60 to cover 62 places buttons 16 and 18 in proper position for selective interaction with elements of electrical assembly 14. For example, upon coupling base 60 to cover 62, activation button 16 is positioned immediately adjacent and in front of activation switch 40 such that button 16 can be later depressed to interface with activation switch 40 to activation power supply to electrical assembly 14 and/or a new gaming session.

When housing 12 is assembled, interface button member 190 is positioned over array 52 of lights 32 and array 54 of electrical contact pads 42 such that one electrical contact node 206 and therefore, one protruding button head 198, is positioned adjacent but slightly spaced from each electrical contact pad 42. More specifically, in one embodiment, primary panel 192 of interface button member 190 contacts PCB 30 and one light 32 and one adjacent electrical contact pad 42 are both maintained within a cavity formed by crush zone 202. Since one light 32 is isolated in each crush zone 202, illumination from light 32 is largely concentrated toward the corresponding game interface button 18 just above each light 32 and corresponding with the respective crush zone 202. The positioning of one electrical contact pad 42 per crush zone 202 also allows electrical contact node 206 coupled to internal surface 208 in crushed zone 202 to only interact with one electrical contact pad 42 ensuring more consistent interaction and cause and effect results when a game interface button 18 is pressed, collapsing crushed zone 202, and moving electrical contact node 206 in into direction interaction with the corresponding electrical contact pad 42 on PCB 30.

At 310, batteries 36 are positioned in battery cavities 84 of housing 12 and are placed in direct contact with battery contact plates 56. Once in contact with battery contact plates 56, batteries 36 are in communication with a remainder of electrical assembly 14. Once batteries 36 are positioned, in one embodiment, door 96 is placed over batteries 36 in batter chamber recess 90 and is secured to housing 12 via door fastener 104.

At 310, face panel 162 is placed over exterior surface 134 of primary panel 130 of cover 62 such that interface button apertures 168 of face panel 162 align with interface button apertures 140 of cover 62. Upon coupling to cover 62, face panel 162, more particularly, button indicator 170 of face panel 162 extends over activation button 16 such that activation button 16 is hidden from view, but a bearer is alerted to its positioned by any indicia on button indicator 170.

In this assembled configuration, transaction product 10 is configured to work in its non-transactional capacity. For example, integrated circuit 44 is configured to instruct electrical assembly 14 to initiate a gaming session upon signal receipt from activation switch 40, for example, as caused by bearer interaction with button indicator 170, which moves activation button 16 to depress activation switch 40. Upon activation of gaming session, electrical assembly 14 under the direction of integrated circuit 44, is configured to light individual ones of lights 32 in a random sequence or pattern with only on of lights 32 being lit at a time. Each light 32 is illuminated for a short predetermined period of time or until the bearer presses the one of gaming interface buttons 18 illuminated by the respective light 32, whichever time period is shorter. This continues throughout the random sequence of illumination or until a bearer incurs three erroneous responses, that is either the bearer does not press the gaming interface button 18 before it is no longer illuminated or the bearer presses one of gaming interface buttons 18 that does not correspond to the currently illuminated light 32. In one embodiment, once three, or other suitable preset number, of errors are incurred, the sequence is terminated and the gaming session aborted. If the correct gaming interface buttons 18 continue to be pressed, the gaming session continues to more difficult levels where the predetermined illumination times are shorter requiring faster bearer response. Other suitable games or gaming sessions are also contemplated.

In one embodiment, electrical assembly 14 is configured to output sounds via speaker 34 corresponding with various portions of the gaming session. For example, electrical assembly 14 may output a sound, e.g., one audio tone or series of audio tones, signifying a start of a gaming session, another sound when the bearer presses the correct gaming interface button 18, i.e., the currently illuminated gaming interface button 18, another sound when a bearer presses an incorrect gaming interface button 18, another sound to initiate or during game play, another sound when a bearer "wins" a gaming session, and/or another sound when a bearer "loses," i.e., incurs the predetermined number of errors.

At 314, account identifier 20 is added to housing 12, if account identifier 20 is not already part of transaction product 10, adding the financial transaction functionality to transaction product 10. Although pictured in FIG. 16 as occurring after all of operations 304, 306, 308, 310, and 312, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 304, 306, 308, 310, and 312 as will be apparent to those of skill in the art upon reading this application.

At 316, transaction product 10 is coupled with backer 220 as generally illustrated with additional reference to FIGS. 13 and 14 to form transaction product assembly 226. Transaction product 10 may be adhered, skinned to, blister packed with or otherwise suitably coupled with backer 220. For example, in the illustrated embodiments, blister pack 244 is used to couple transaction card 10 to backer 220. In one embodiment, account identifier 20 of transaction product 10 is accessible for scanning while transaction product 10 is coupled with backer 220, for example, through opening 232 in backer 220.

Figure 17:
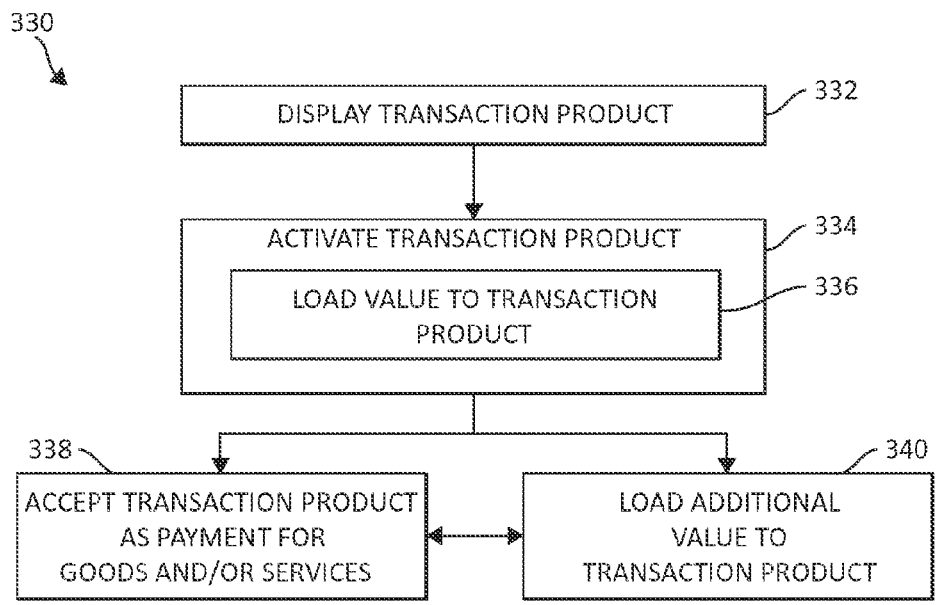
FIG. 17 is a flow chart illustrating a method of encouraging purchase and facilitating use of a transaction product, according to one embodiment of the present invention.

FIG. 17 is a flow chart illustrating one embodiment of a method 330 of encouraging purchase and facilitating use of transaction product 10 by consumers and/or recipients. At 332, transaction product 10 is placed on or hung from a rack, shelf, or other similar device to display transaction product 10 for sale to potential consumers. In one embodiment, a depiction of transaction product 10 is placed on a web site for viewing and purchase by potential consumers. In one example, display of transaction product 10 includes advertising regarding the non-transactional functionality of transaction product 10 to encourage consumer purchase of transaction product 10, for example, in the form of indicia 234, 236, 238, 240, 242, etc.

At 334, a consumer who has decided to purchase transaction product 10 presents transaction product 10 on backer 220 to a retail store employee, retail store kiosk, remote terminal or other person or device to scan account identifier 20 to access an account or record linked to account identifier 20. In particular, account identifier 20 is scanned or otherwise accessed, for example through opening 232 of backer 220 to activate transaction product 10, more particularly, transaction product 10 of transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 20) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services from the retailer at the affiliated retail setting (e.g., a retail store or web site) or can be used in exchange for calling minutes, services, etc. In one embodiment, where transaction product 10 is displayed on a web site at 332, then, at 334, transaction product 10 may be activated in any suitable method and may not require the physical scanning of account identifier 20 to be activated or to otherwise access the associated account or record such as at 336.

In one example, at 338, the retailer accepts transaction product 10 or the associated value in the corresponding account as payment toward the purchase of goods and/or services made by the current bearer of transaction product 10. In particular, the value currently loaded on transaction product 10 (i.e., stored or recorded in the account or record linked to account identifier 20) is applied toward the purchase of goods and/or services. At 340, additional value is optionally loaded on transaction product 10 at a point-of-sale terminal, kiosk or other area of the retail store, retail web site, or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services is limited by whether the account or record associated with transaction product 10 has any value stored or recorded therein at the time of attempted redemption.

Figure 18:
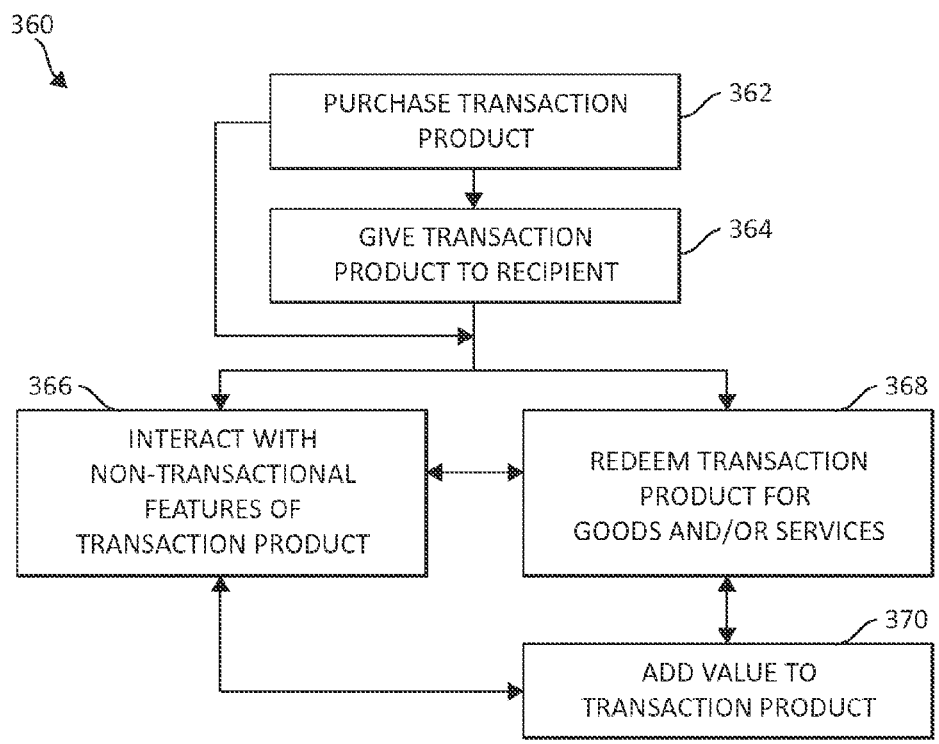
FIG. 18 is a flow chart illustrating a method of using a transaction product, according to one embodiment of the present invention.

FIG. 18 is a flow chart illustrating one embodiment of a method 360 of using transaction product 10 (e.g., FIGS. 1-8). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 226 (e.g., FIGS. 13 and 14) along with backer 220.

Upon purchasing transaction product 10, a retail store employee, a retail store kiosk or other person or device scans account identifier 20 (e.g., FIGS. 3, 11, and 14), for example, through opening 232 of backer 220 or otherwise reads or accesses account identifier 20. Upon accessing account identifier 20, the account or record linked to account identifier 20 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 20 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to partygoers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with non-transactional features of transaction product 10. In one embodiment, playing or otherwise interacting with transaction product 10 at 366 includes pressing button indicator 170 to activate a gaming session and attempting to correctly press ones of the game interface buttons 18 as each of the game interface buttons 18 are illuminated in a random sequence. Other gaming sessions and/or interactions with transaction product 10 will also be apparent to those of skill in the art upon reading the present application.

At 368, the consumer or recipient redeems transaction product 10 with transaction product 10 or transaction product 10 alone following its removal from housing 12 for goods and/or services, for example, from the retail store or web site. At 370, the consumer or recipient of transaction product 10 optionally adds value to transaction product 10, more particularly, to the remotely, database stored account or record associated with account identifier 20 included therewith, at the retail store or over the Internet (i.e., via the web site). Upon playing with transaction product 10 at 366, redeeming transaction product 10 at 368 or adding value to transaction product 10 at 370, the consumer or recipient of transaction product 10 subsequently can perform either of operations 366, 368, or 370 as desired. In one example, operation 366 and one or more of operations 368 and 370 can be performed substantially simultaneously wherein only the one or more articles 16 are used at 366 and/or wherein only transaction product 10 is used at 368 and/or 370. In one embodiment, the ability of the consumer or recipient to repeat redeeming transaction product 10 at 370 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store. Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the bearer's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill. For example, while primarily described herein as providing a simulated meter or measurement device, in one example, a transaction product may be provided including an actual meter or measurement device.

What is claimed is:

1. A transaction product, comprising:
   an electrical assembly including a light;
   a housing substantially enclosing the electrical assembly including the light, wherein the housing defines an exterior surface and an aperture extending through the exterior surface;
   a button having a rounded extremity, the button extending from within the housing to outside the housing through the aperture and beyond the exterior surface, wherein the button aligns with and surrounds the light such that when the light is lit the button is illuminated, the button defines a crush zone coupled to the rounded extremity and positioned within the housing, the light is supported within the housing by a printed circuit board, and the crush zone surrounds the light on the printed circuit board;
   an account identifier coupled to the housing and linking the transaction product to a financial account having an associated monetary value available toward a price of a purchase, wherein the account identifier is machine readable; and
   an electrical contact pad coupled to the printed circuit board near the light;
   wherein:
      the electrical contact pad is surrounded by the crush zone, and
      the button includes a recessed surface facing the crush zone and an electrical contact node coupled to the recessed surface, such that when the button is pushed, the crush zone collapses and the electrical contact pad contacts the electrical contact node causing the light to one of illuminate and stop illuminating.

2. The transaction product of claim 1, wherein the account identifier is a bar code.

3. The transaction product of claim 1, wherein the account identifier includes at least one of a bar code, a magnetic strip, a smart chip, and a radio frequency identification (RFID) device.

4. The transaction product of claim 1, in combination with a remote database storing the financial account.

5. The transaction product of claim 1, wherein the button is formed of a diffusive material that diffuses light from the light to illuminate a substantial entirety of the button.

6. The transaction product of claim 1, wherein:
   the button is one of a plurality of buttons extending from a primary panel formed of the same material as the plurality of buttons,
   the primary panel extends between and is coupled to each of the plurality of buttons opposite the rounded extremity; and
   the primary panel is enclosed within the housing.

7. A transaction product, comprising:
   an electrical assembly including a light;
   a housing substantially enclosing the electrical assembly including the light, wherein the housing defines an exterior surface and an aperture extending through the exterior surface;
   a button having a rounded extremity, the button extending from within the housing to outside the housing through the aperture and beyond the exterior surface, wherein the button aligns with and surrounds the light such that when the light is lit the button is illuminated; and an account identifier coupled to the housing and linking the transaction product to a financial account having an associated monetary value available toward a price of a purchase, wherein the account identifier is machine readable;

wherein:
the light is one of a plurality of lights,
the button is one of a plurality of buttons,
each button of the plurality of buttons surrounds a different one of the plurality of lights,
the electrical assembly includes an integrated circuit, which directs the electrical assembly to light a random sequence of the plurality of lights maintaining each light in the random sequence for a shorter of a predetermined time period and a time period between when each light is first lit and when a user presses a corresponding one of the plurality of buttons that extends over the light that was lit as part of a gaming session, and
the random sequence only lights one light at a time.

8. The transaction product of claim 7, in combination with a backer and a blister pack configured to support and enclose the transaction product therebetween, the blister pack including a plurality of separate apertures each providing access to a different one of the plurality of buttons while the transaction product is maintained within the blister pack such that the user can initiate and play the gaming session on the transaction product while the transaction product is maintained within the blister pack.

9. The transaction product of claim 8, wherein:
the exterior surface is a first exterior surface,
the housing includes a second exterior surface opposite the first exterior surface, and
the account identifier is coupled to the second exterior surface.

10. The transaction product of claim 1, further comprising indicia applied to each of the housing and the button, wherein the indicia are visually associated to a retailer adapted to accept the associated monetary value of the financial account as payment toward the price of the purchase.

11. The transaction product of claim 1, further comprising decorative scenery applied to the housing, and the button includes decorative indicia visually corresponding to the decorative scenery.

12. A transaction product, comprising:
an electrical assembly including a light;
a housing substantially enclosing the electrical assembly including the light, wherein the housing defines an exterior surface and an aperture extending through the exterior surface;
a button having a rounded extremity, the button extending from within the housing to outside the housing through the aperture and beyond the exterior surface, wherein the button aligns with and surrounds the light such that when the light is lit the button is illuminated; and
an account identifier coupled to the housing and linking the transaction product to a financial account having an associated monetary value available toward a price of a purchase, wherein the account identifier is machine readable;
wherein the electrical circuit further comprises a speaker and is configured to output a different sound upon an occurrence of each of the following: a start of a game, a user pressing a lit one of the plurality of buttons, and a user pressing one of the plurality of buttons that is not lit.

13. A transaction product, comprising:
an electrical assembly including a light;
a housing substantially enclosing the electrical assembly including the light, wherein the housing defines an exterior surface and an aperture extending through the exterior surface;
a button having a rounded extremity, the button extending from within the housing to outside the housing through the aperture and beyond the exterior surface, wherein the button aligns with and surrounds the light such that when the light is lit the button is illuminated; and
an account identifier coupled to the housing and linking the transaction product to a financial account having an associated monetary value available toward a price of a purchase, wherein the account identifier is machine readable;
wherein the button is a game interface button, the transaction product further comprises an activation button formed separate from the game interface button, and the activation button is configured to interact with the electrical assembly to initiate a game session including lighting of the light.

14. A stored-value product comprising:
an electrical assembly including means for providing illumination and means for switching which of means for providing illumination is lit;
means for interfacing with the means for switching, wherein the means for interfacing includes:
means for surrounding all but one side of one of the means for providing illumination and one of the means for switching, wherein:
the means for surrounding is at least partially collapsible down upon the one of the means for providing illumination and the one of the means for switching, wherein the means for surrounding includes an electrical contact node facing the one of the plurality of means for switching, the electrical contact node is configured to selectively contact the one of the means for switching when the means for surrounding is at least partially collapsed, and
the means for surrounding is configured to diffuse the illumination and glow when the one of the means for providing illumination is lit; and
means for linking the stored-value product with an account having a value associated therewith such that the stored-value product can be used as payment toward a purchase of one or more of goods and services;
wherein each of the means for surrounding corresponds to a different one of the means for providing illumination and a different one of the means for switching, and all of the means for surrounding commonly extend from a single planar panel formed as a single piece of material with the means for surrounding.

15. The stored-value product of claim 14, further comprising means for enclosing the electrical assembly and for partially enclosing the means for surrounding, wherein the single planar panel is surrounded by the means for enclosing.

16. The stored-value product of claim 14, wherein the electrical assembly is at least partially supported by a printed circuit board within the means for enclosing, and each of the means for providing illumination and the means for switching are coupled to the printed circuit board.

17. A stored-value product comprising:
an electrical assembly including means for providing illumination and means for switching which of the means for providing illumination is lit;

a housing substantially enclosing the electrical assembly including the means for providing illumination, wherein the housing defines an exterior surface and an aperture extending through the exterior surface;

means for interfacing with the means for switching, wherein the means for interfacing has a rounded extremity, extends from within the housing to outside the housing through the aperture and beyond the exterior surface, and the means for interfacing includes:

means for surrounding all but one side of one of the means for providing illumination and one of the means for switching, wherein:

the means for surrounding is at least partially collapsible down upon the one of the means for providing illumination and the one of the means for switching and is illuminated when the one of the means for providing illumination is lit, wherein the means for surrounding includes an electrical contact node facing the one of the means for switching, the electrical contact node is configured to contact the one of the means for switching when the means for surrounding is at least partially collapsed, and the means for surrounding is configured to diffuse the illumination and glow when the one of the means for providing illumination is lit; and an account identifier coupled to the housing and linking the transaction product to a financial account having an associated monetary value available toward a price of a purchase, wherein the account identifier is machine readable.

* * * * *